(12) United States Patent
Fukuda et al.

(10) Patent No.: US 7,011,457 B2
(45) Date of Patent: *Mar. 14, 2006

(54) OPTICAL COUPLING APPARATUS

(75) Inventors: Kazuyuki Fukuda, Chiyoda (JP); Hideyuki Kuwano, Yokohama (JP); Yoshiaki Niwa, Yokohama (JP); Naoki Matsushima, Yokohama (JP)

(73) Assignee: OpNext Japan, Inc., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/989,290

(22) Filed: Nov. 17, 2004

(65) Prior Publication Data

US 2005/0063649 A1 Mar. 24, 2005

Related U.S. Application Data

(63) Continuation of application No. 10/355,001, filed on Jan. 31, 2003, now Pat. No. 6,821,030.

(30) Foreign Application Priority Data

Mar. 12, 2002 (JP) .............................. 2002-066285

(51) Int. Cl.
G02B 6/36 (2006.01)

(52) U.S. Cl. ......................................... 385/92; 385/93

(58) Field of Classification Search ................. 385/92, 385/93, 88, 94, 33, 34, 35, 89, 90, 91

See application file for complete search history.

(56) References Cited

U.S. PATENT DOCUMENTS

| 5,745,625 | A | 4/1998 | Aikiyo et al. |
| 5,963,697 | A | 10/1999 | Kosugi |
| 6,524,016 | B1 | 2/2003 | Ohki et al. |
| 6,568,864 | B1 | 5/2003 | Ishimaru |
| 6,572,279 | B1 | 6/2003 | Takagi |
| 6,676,306 | B1 | 1/2004 | Ikeda et al. |
| 6,821,030 | B1 * | 11/2004 | Fukuda et al. ................ 385/92 |
| 2002/0018627 | A1 | 2/2002 | Kato et al. |

FOREIGN PATENT DOCUMENTS

| JP | 5-150146 | 6/1993 |
| JP | 11-330564 | 11/1999 |
| JP | 2001-284699 | 10/2001 |

* cited by examiner

*Primary Examiner*—Chau Nguyen N.
(74) *Attorney, Agent, or Firm*—Antonelli, Terry, Stout and Kraus, LLP.

(57) ABSTRACT

An optical coupling apparatus having a temperature control element on which a semiconductor light emitting element, a substrate and a lens are mounted, the semiconductor light emitting element being mounted on the substrate, and rays of light from the semiconductor light emitting element being introduced into the lens. A base on which the temperature control element is disposed, a through-hole portion formed in a housing wall portion installed on the base, penetrating through the housing wall portion and having a wall surface portion longer than a thickness of the housing wall portion and an optical fiber communicated with the through-hole portion and receiving converted light from the lens introduced thereto. A length of the substrate in a direction connecting the light emitting element to the optical fiber is within a range from 0.1 to 0.25 with respect to a length of the base sandwiched by the housing walls of the substrate.

15 Claims, 3 Drawing Sheets

OPTICAL COUPLING APPARATUS

CROSS REFERENCE TO RELATED APPLICATION

This is a continuation of U.S. application Ser. No. 10/355,001, filed Jan. 31, 2003, now U.S. Pat. No. 6,821,030, the subject matter of which is incorporated by reference herein.

BACKGROUND OF THE INVENTION

This invention relates to an optical coupling apparatus including a semiconductor light emitting device and an optical fiber that are optically connected to each other. More particularly, the invention relates to a single lens optical coupling apparatus that attains optical coupling by use of a single lens.

A known optical coupling apparatus allows an outgoing beam from a semiconductor laser to be incident into an end face of an optical fiber through a lens, and optical coupling is attained between the semiconductor laser and the optical fiber through the single lens, as described in JP-A-05-150146. This reference discloses a construction in which the semiconductor laser, the lens and a light reception device are mounted onto a substrate having thick portions on both sides thereof that are parallel to an optical axis to suppress the change of optical coupling in the optical axis direction and to reduce an optical axis error.

Another reference, JP-A-11-330564, describes optical coupling between an optical semiconductor device and an optical fiber by use of a single lens. The optical semiconductor device and the lens are mounted onto a block. The block is arranged on a heat sink and is encompassed by a package. An optical fiber is inserted and fixed into a cylindrical optical fiber fixing portion disposed on a side surface of the package. Fixing members capable of deformation are interconnected to a package main body to prevent an optical axis error of the package resulting from thermal expansion of the heat sink when the heat sink is screw-fixed to mount an optical communication appliance. Still another reference, JP-A-2001-284699, discloses a construction in which two lenses are used to optically couple a semiconductor laser and an optical fiber, and the semiconductor laser and a first lens are mounted onto a base and are disposed on a bottom plate of a package through a Peltier device. A fitting cylinder is so fitted as to protrude from inside and outside of the package, and a second lens and the optical fiber are disposed inside the cylinder and at an end portion, respectively.

BRIEF SUMMARY OF THE INVENTION

The inventors of this invention have found that the constructions of the known references are not yet satisfactory as a construction of a single lens optical coupling apparatus that is very susceptible to influences of thermal deformation of a base and surrounding portions when service life of the apparatus is extended or when the apparatus is applied to long-distance optical transmission.

Evaluation items of performance of an optical coupling apparatus include optical coupling temperature characteristics (hereinafter called "tracking error") relating to stability of optical coupling in a temperature range from a low temperature to a high temperature. The tracking error occurs mainly as an operating temperature of the optical coupling apparatus changes to invite thermal deformation, and this thermal deformation in turn invites a change of the optical coupling state between a semiconductor light emitting device and an optical fiber.

JP-A-2001-284699 as the known reference described above employs a confocal optical system that uses two lenses and suppresses the change of optical coupling due to thermal deformation. The confocal optical system has a feature in that tolerance of a positioning error on the change of optical coupling becomes greater between the two lenses. The optical coupling apparatus makes the most of this feature, exhibits a small change of optical coupling even when thermal deformation develops, and makes it easier to satisfy the tracking error specification. However, the confocal optical system using the two lenses increases the number of components and the number of assembly steps and is likely to invite the increase of the production cost.

It is more advantageous to establish optical coupling by using one lens in order to reduce the number of components as well as the number of assembly steps and to lower the production cost. However, because the optical coupling system using one lens does not have a broad tolerance portion of the positioning error of the confocal optical system, the change of optical coupling unavoidably occurs due to very limited thermal deformation. Therefore, the optical coupling apparatus of the one-lens optical system must employ a component construction that makes the difference of the thermal expansion ratios smaller than that of the component construction of the confocal optical system to suppress thermal deformation. Because the optical coupling apparatus is constituted by a plurality of materials having mutually different thermal expansion ratios, however, it is extremely difficult to completely eliminate thermal deformation unless specific materials are used to form the components. When such specific components are employed, the production cost increases with the result that the effect of lowering the cost of production by using one lens is lost.

It has been found that the form of JP-A-05-150146 and JP-A-11-330564 occupies a large ratio to the length of a so-called "base portion" of the housing, and is greatly susceptible to deformation of the base. Therefore, it is believed difficult to sufficiently reduce the tracking error. In addition, because JP-A-11-330564 does not mount the Peltier device, temperature control by the Peltier device is not possible. When any temperature change occurs, thermal expansion and thermal deformation of the block further increase the positioning error between the semiconductor light emitting device and the lens in the direction of height. Consequently, the position of the laser beam to be condensed to the optical fiber greatly changes, and the tracking error specification cannot be satisfied easily.

It is therefore an object of the invention to provide an optical coupling apparatus that can solve the problems described above.

To accomplish this object, the invention employs a construction that can insure long service life and can be applied to long distance optical communication even in a form susceptible to influences of thermal deformation of a base and surrounding components such as in the case of a single lens optical coupling apparatus.

For example, a construction capable of satisfying an optical coupling change of ±0.5 dB within a temperature range from −20° C. to 75° C. as a tracking error specification can be accomplished at a low cost of production.

The invention can specifically take the following forms, for example.

(1) An optical coupling apparatus including a base; a temperature controlling device disposed on the base; a substrate arranged on the temperature controlling device and having mounted thereto a semiconductor light emitting device and a lens into which rays of light from the semiconductor light emitting device are introduced while being diffused; a through-hole portion formed in a housing wall portion installed on the base, penetrating through the housing wall portion and having a wall surface portion longer than a thickness of the housing wall portion; and an optical fiber communicated with the through-hole portion and receiving converged light from the lens introduced thereto; wherein a length of the substrate in a direction connecting the light emitting device to the optical fiber is within a range from 0.1 to 0.25 with respect to a length of the base sandwiched by the housing walls of the substrate.

(2) The optical coupling apparatus described in the construction (1) further comprises an optical isolator which communicates with the through-hole portion and into which converged light is introduced on the side of the lens from an end portion of the optical fiber, wherein the optical isolator and at least a part of the optical fiber are arranged inside a region of the through-hole portion encompassed by the housing walls, and the end portion of the optical fiber is arranged at a position within three times the thickness of the housing wall from an outer or inner side surface of the housing wall in a direction connecting the light emitting device and the optical fiber. Alternatively, the end portion of the optical fiber is arranged within a range of 3.0 mm from the outer or inner side surface of the housing wall.

(3) In the optical coupling apparatus described in the construction (1) or (2), the end portion of the optical fiber is formed at a position within a range from 3.5 to 12.5 times the thickness of the lens from the light emitting device. Alternatively, the end portion of the optical fiber is arranged at a position within a range from 3.5 to 7.5 mm from the light emitting device.

(4) In the construction of the optical coupling apparatus described in any of (1) to (3), the temperature controlling device is arranged within a range of 6.0 mm from the inner side wall of the housing wall in a direction of the temperature controlling device connecting the light emitting device to the optical fiber.

(5) An optical coupling apparatus including a terminal substrate having a wiring layer and lead terminals connected to the wiring layer that are applied to the housing wall, wherein a temperature controlling device is electrically connected to the terminal substrate through wires, and this connection portion is positioned closer to the optical fiber than the lead terminals corresponding to the temperature controlling device.

(6) An optical coupling apparatus wherein a terminal substrate having a wiring layer and lead terminals connected to the wiring layer are provided to the housing wall, a thermistor is mounted to the substrate and is electrically connected to the wiring layer of the terminal substrate through wires, the temperature controlling device is electrically connected to the wiring layer of the terminal substrate through wires and a length of the wiring layer on the terminal substrate corresponding to the thermistor is smaller than a length of the wiring layer on the terminal substrate corresponding to the temperature controlling device.

(7) In the optical coupling apparatus, a terminal substrate having a wiring layer and lead terminals connected to the wiring layer are provided to the housing wall, the wiring layer includes a relay substrate having a wiring layer electrically connected to the wiring layer through wires, and is electrically connected to the substrate for mounting the light emitting device, through the wiring layer of the relay substrate and through wires, and the light emitting device is arranged closer to the optical fiber than the lead terminals corresponding to the light emitting device.

Even when thermal deformation and warp deformation occur with the change of an ambient temperature and due to a thermal load, the constructions of the optical coupling apparatuses described above can suppress the change of optical coupling between the semiconductor light emitting device and the optical fiber, and can also satisfy the specification of the tracking error even when thermal deformation and warp deformation occur. In other words, even when warp deformation of the base occurs with the temperature change, fluctuation of the laser beam outgoing from the lens mounted to the substrate in its traveling direction can be suppressed when the length of the substrate having the temperature controlling device mounted thereto is kept within a range from 0.1 to 0.25 to the length of the base. The housing wall undergoes deformation in such a fashion as to fall down towards the inside of the housing with the connection position with the base as a support point. Therefore, when a part of the optical isolator or the distal end of the optical fiber is arranged within a predetermined range of the through-hole portion encompassed by the housing wall portions, the positioning error of the distal end of the optical fiber can be reduced. Furthermore, because the housing walls so operate as to suppress thermal deformation of the base, thermal deformation becomes smaller at positions closer to the housing walls. For this reason, when the temperature controlling device having the semiconductor light emitting device and the lens mounted thereto is arranged within a predetermined range close to the housing wall portions, deformation of the substrate to which the temperature controlling device is mounted can be reduced, and the positioning error of the laser beam outgoing from the lens resulting from this deformation can be suppressed. Because the invention employs the construction and the component arrangement for suppressing the positioning error of the distal end of the optical fiber and the positioning error of the outgoing beam from the lens, the invention can suppress the change of optical coupling resulting from thermal deformation to a low level without using a specific component construction. In this way, the invention can satisfy the tracking error specification even in an optical coupling apparatus of a one-lens optical system.

Because the optical isolator and the optical fiber are put into the housing wall portions, the protrusion distance of the optical fiber protruding outside from the housing wall portion can be reduced. In consequence, the overall size and shape of the optical coupling apparatus can be reduced and high-density packaging to the packaging substrate can be achieved.

The temperature controlling device is electrically connected to the terminal substrate provided to the housing, and this connection portion is arranged at a position closer to the optical fiber side than the lead terminal corresponding to the temperature controlling device. Therefore, a wide space can be secured on the opposite side to the optical fiber while interposing the temperature controlling device. An expansion unit for improving functions can be easily arranged in this space and the functions of the optical coupling apparatus can be improved without inviting a drastic change of the construction. The length of the wire connecting the terminal substrate to the temperature controlling device can be formed to the minimum length and calorific power due to the increase of an impressed current can be reduced. Therefore, even when any change occurs in the ambient temperature, defect of the wires can be prevented, and the temperature controlling device can be stably driven to provide an optical coupling apparatus having high reliability. Furthermore, because the invention employs the single lens for optically coupling the semiconductor light emitting device and the optical fiber, the invention can reduce the number of components and can accomplish easy assembly.

The invention can provide the optical coupling apparatus of the one-lens optical lens system that can stably keep optical coupling between the laser diode and the optical fiber and can satisfy the tracking error specification.

Other objects, features and advantages of the invention will become apparent from the following description of the embodiments of the invention taken in conjunction with the accompanying drawings.

DETAILED DESCRIPTION OF THE INVENTION

Preferred embodiments of the invention will be hereinafter described with reference to FIGS. 1 to 5. Incidentally, illustration of some of components is appropriately omitted throughout the drawings to simplify the illustration. The invention is not particularly limited to the following embodiments but may take other forms.

Figure 1:
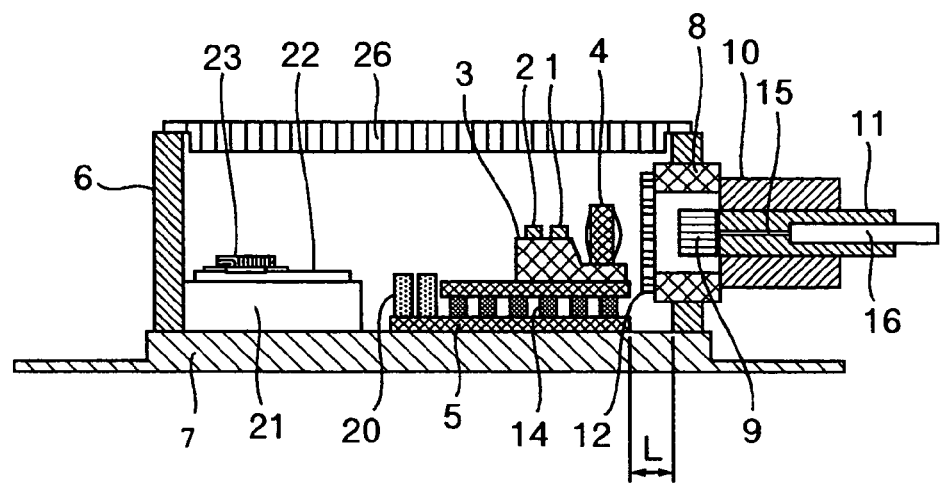
FIG. 1 is a longitudinal sectional view showing an overall construction of an optical coupling apparatus according to a first embodiment of the invention.
Figure 2:
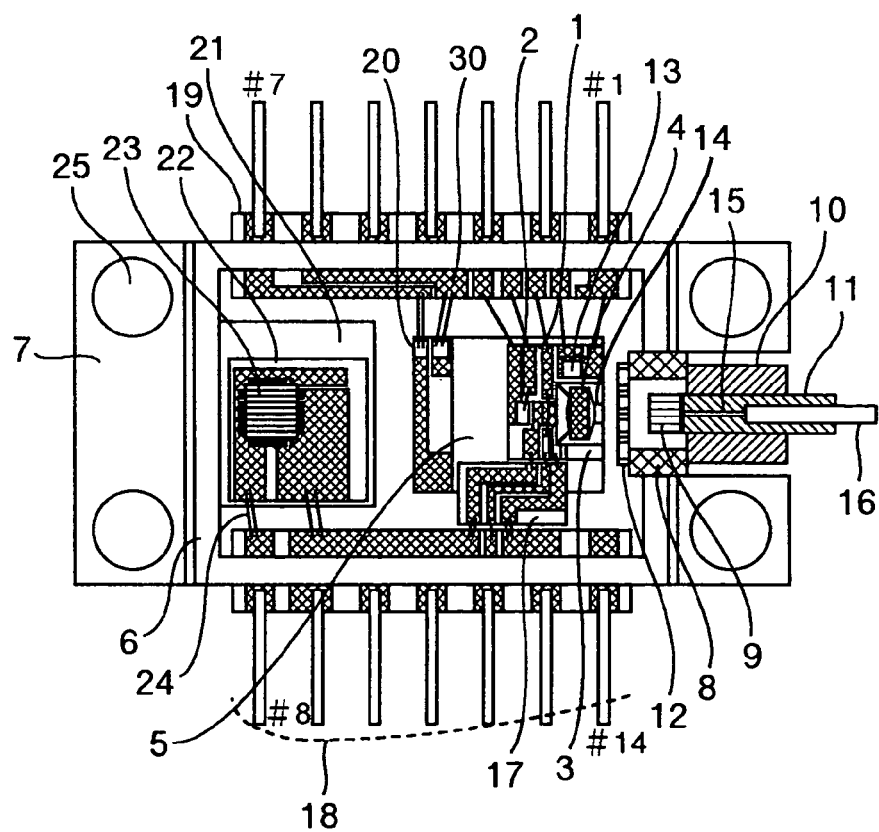
FIG. 2 is a partially sectional top view showing the overall construction of the optical coupling apparatus according to the first embodiment of the invention.

FIG. 1 is a longitudinal sectional view showing a construction of an optical coupling apparatus according to a first embodiment of the invention. FIG. 2 is a partially sectional top view of the optical coupling apparatus shown in FIG. 1.

Referring to FIGS. 1 and 2, the optical coupling apparatus includes a laser diode 1 as a semiconductor light emitting device, a monitor photo-diode 2 as a semiconductor light receiving device for receiving back outgoing laser beams of the laser diode 1, an aspherical lens 4 for condensing front outgoing laser beams of the laser diode 1, a temperature monitoring thermistor 13 for monitoring a temperature change with driving of the laser diode 1, a substrate 3 for mounting these laser diode 1, photo-diode 2, aspherical lens 4 and thermistor 13, and a temperature controlling Peltier device 5 for mounting the substrate 3, installed on a base 7. A housing for accommodating the substrate 3 and the Peltier device 5 includes a package 6 having an outer frame, a base 7 having a bottom surface and a cap 26 fitted to the upper surface of the package 6. A reflection preventing optical isolator 9 for guiding the laser beams condensed by the aspherical lens 4 and an optical fiber holder 11 having therein an optical fiber 15 are fitted into a pipe 8 disposed on a side surface of the package 6 through a guide 10.

The laser diode 1 and the optical fiber 15 are optically coupled with each other by adjusting the positions of the optical fiber holder 11 and the guide 10 in such a fashion that the aspherical lens 4 can condense the front outgoing laser beams from the laser diode 1 and the laser beams so condensed can be introduced into the optical fiber 15 through the optical isolator 9. The optical fiber holder 11 is fixed to the guide 10 while the guide 10 is fixed to an end face of the pipe 8 by laser welding (not shown), respectively, at positions at which the output laser beam from the optical fiber 15 attains the maximum.

The laser diode 1 is a semiconductor light emitting device of a distributed feedback (DFB) type, for example, having an oscillation wavelength having a small spectral width in a single mode. The laser diode 1 has therein a modulation mechanism, for example. The oscillation wavelength is 1,550 nm, for example.

The substrate 3 is formed of a silicon material, and its mounting portion of the aspherical lens 4 is anisotropically etched into a substantially V-shaped groove 14. The aspherical lens 4 is bonded into this V-shaped groove 14 by use of an adhesive or a solder material. A metallize pattern film 30 (hatched portion in FIG. 2) is formed on the upper surface of the substrate 3. The laser diode 1, the photo-diode 2 and the temperature monitoring thermistor 13 are bonded to predetermined positions of the metallize pattern film 30. The laser diode 1, the photo-diode 2 and the thermistor 13 are electrically connected to the metallize pattern film 30 by wire bonding 24. The metallize pattern film 30 has a laminate structure formed by laminating a titanium film, a platinum film and a gold film with a thermal oxide film as the lowermost layer and the gold film as the surface. The thickness of the metallize pattern film 30 is about 1 $\mu$m with the exception of the thermal oxide film of the lowermost layer. An alloy of gold and tin (not shown) having a melting point of 280° C., for example, is further formed on the metallize pattern film 30 at a position at which the laser diode 1 is mounted. The laser diode 1 is positioned and bonded to this position with accuracy in a sub-micron order. The photo-diode 2, too, is bonded in the same way as the laser diode 1. The temperature monitoring thermistor 13 is bonded by use of the solder material. The substrate 3 has a transverse width (in a vertical direction to the sheet of drawing in FIG. 2) of 2.7 mm, a length (in a transverse direction to the sheet of drawing in FIG. 2) of 3.0 mm and a thickness (in the vertical direction to the sheet of drawing in FIG. 1) of 1.0 mm. The depth of the V-shaped groove 14 is within the range from 0.75 mm to 0.8 mm. Here, the size of the substrate 3 is determined to a ratio such that its length is 0.16 to the length of the base 7 inside the frame of the package 6. The term "length of the base 7 inside the frame of the package 6" means the length interposed between the walls of the outer frame of the base.

A part of the side surface of the aspherical lens 4 fitted into the V-shaped groove 14 is cylindrical. The incidence surface of the laser beam and its outgoing surface are surfaces having curvature. The aspherical lens 4 is formed of a glass material, and an AR coat film for preventing reflection is deposited to the curvature surfaces on both sides through which the laser beams pass. A side surface of the cylindrical portion of the aspherical lens 4 is a flat surface, and this side surface comes into contact with a slope of each side of the V-shaped groove 14. The aspherical lens 4 has a shape and is arranged in such a fashion that its side surface does not come into contact with the bottom surface of the V-shaped groove 14 but defines a slight space between them. The flat portion of the side surface of the aspherical lens 4 has a length of about 0.25 mm. When the flat portion has such a length, the aspherical lens 4 does not fall but can stand sufficiently stably when fitted into the V-shaped groove 14. Here, the aspherical lens 4 has a diameter of φ1.5 mm and a transverse width of 0.8 mm but this size is not restrictive. Therefore, it is also possible to cover the aspherical lens 4 with a metal frame and to stabilize mounting to the V-shaped groove 14 by elongating its cylindrical portion.

Bonding and fixing of the aspherical lens 4 is carried out in the following way. First, an adhesive (not shown) is applied to both slopes of the V-shaped groove 14. After the end face of the laser diode 1 on the side of the aspherical lens 4 and the end face of the aspherical lens 4 on the side of the laser diode 1 are so adjusted as to keep a predetermined distance, the aspherical lens 4 is fitted and pushed into the V-shaped groove 14. Next, ultraviolet rays are irradiated for a predetermined time to cure the adhesive and to thus bond and fix the aspherical lens 4 to the substrate 3.

Heat-treatment is thereafter carried out to complete the curing reaction of the adhesive and to further stably bond and fix the aspherical lens 4 to the substrate 3. The adhesive is a UV-curable adhesive that undergoes the curing reaction by the ultraviolet rays and heating. The load of pushing the aspherical lens 4 is from dozens to hundreds of grams. Here, the adhesive uses the UV-curable adhesive and its bonding and fixing procedure is explained. When bonding is made by use of a solder, however, it is of importance to secure wettability of the solder material by applying the metallize film to the V-shaped groove 14. When an aspherical lens 4 the side surface of which is covered with a metal frame is used as the aspherical lens 4, the metallize film must be applied to the side surface of the metal frame, too. The solder material is preferably an alloy of tin and silver having a melting point equal to, or lower than, the melting point of the alloy of gold and tin bonding and fixing the laser diode 1, that is, 280° C.

Each of the upper and lower surfaces of the temperature controlling Peltier device 5 is formed of a ceramic sheet. A plurality of thermoelectric semiconductors of P and N types is connected in series by a metal electrode between the upper and lower surfaces. The Peltier device 5 conducts heating and cooling when a current is applied thereto. Current control of the Peltier device 5 is made in such a fashion as to detect the temperature change due to driving of the laser diode 1 through the resistance change of the thermistor 13, to keep the resistance value of the thermistor 13 at a predetermined value and to stabilize the oscillation wavelength of the laser diode 1 and the outgoing beams. The lower surface ceramic sheet of the Peltier device 5 protrudes much more than the upper surface sheet, and a post 20 for supplying the current to the Peltier device 5 is disposed on this protruding portion. The post 20 is electrically connected to the terminal substrate 19 of the package 6 through gold wire bonding 24. The metallize pattern film 30 of the terminal substrate 19 electrically connected to the Peltier device 5 is connected to a lead terminal 18 (Nos. 6 and 7 leads) for supplying the current to the Peltier device 5 and is extended in the proximity or nearness of the post 20 of the Peltier device 5. The metallize pattern film 30 is formed on the terminal substrate 19 so that the wire bond position is closer to the end portion of the optical fiber than the position of the lead terminal. Wire bonding 24 is made with the minimum possible length by reducing the distance from the metallize pattern film 30 of the terminal substrate 19 to the post 20.

The substrate 3 mounted to the upper surface of the Peltier device 5 is arranged in a direction closer to the optical fiber 15. In consequence, the distance between the metallize pattern film 30 electrically connected to the thermistor 13 and to the photo-diode 2 and the metallize pattern film 30 of the terminal substrate 19 corresponding to the thermistor 13 and to the photo-diode 2 becomes small, and wire bonding 24 can be made with the minimum length. When wire bonding 24 is fitted shortly, mutual contact of the wires 24 can be prevented. The mounting position of the Peltier device 5 is a position close to the side surface of the package 6 on the side where the optical fiber 15 is disposed. Here, the distance (L in FIG. 1) from the end face of the Peltier device 5 to the side surface of the package 6 is 2.5 mm, for example. The length of the metallize pattern film 30 on the terminal substrate 19 electrically connected to the thermistor through the wire is smaller than the length of the metallize pattern film 30 on the terminal substrate 19 so formed as to be electrically connected to the Peltier device through the wire.

A relay substrate 17 is mounted to the upper surface of the Peltier device 5 besides the substrate 3. The relay substrate 17 is formed of a ceramic material and electrically connects the laser diode 1 to the terminal substrate 19 of the package 6. The substrate 3 and the relay substrate 17, and the relay substrate 17 and the terminal substrate 19 of the package 6, are electrically connected by gold wire bonding 24, respectively. The metallize pattern film 30 is applied to each of the upper and lower surfaces of the relay substrate 17 so as to reduce degradation, loss and reflection of electric signals for driving the laser diode 1. Here, the metallize pattern film 30 is formed into a crank shape. The pattern film 30 at the center operates as a signal line of the laser diode 1 and its both sides, as the ground of the laser diode 1. In this case, the laser diode 1 is positioned closer to the side of the end portion of the optical fiber than the position of the lead terminal, and the metallize pattern 30 is formed for connecting them.

A base 21 separate from the Peltier device 5 is formed on the upper surface of the base 7 inside the package 6 on the side opposite to the mounting side of the optical fiber 15 while sandwiching the Peltier device 5 to which the laser diode 1 is mounted. The base 21 is spaced apart from the Peltier device 5. An IC, an LSI, etc, as the semiconductor device 3 are mounted to the base 21 through a ceramic substrate 22. The metallize pattern film 30 is applied to the upper surface of the ceramic substrate 22 to electrically connect the semiconductor device 23 to the terminal substrate 19 of the package 6 through gold wire bonding 24. The base 21 to which the semiconductor device 23 is mounted is formed of a Cu—W type alloy having a high heat transfer rate and excellent in heat radiation property so that heat generated during driving of the semiconductor device 23 can be transferred to, and radiated from, the base 7. Screw fixing holes 25 for fitting the optical coupling apparatus to a fixed substrate and a heat radiation substrate (not shown) are formed at portions of the base 7 extended from the side surface of the package 6 (in the transverse direction of the sheet of drawings in FIGS. 1 and 2). The material of the base 7 is a Cu—W type alloy.

The terminal substrate 19 and the lead terminal 18 are provided to the side surface of the package 6 (in the vertical direction of the sheet of drawing in FIG. 2) to electrically connect the inside of the package 6 to its outside. This embodiment represents the optical coupling apparatus having seven lead terminals with a gap of 2.54 mm on one side, by way of example. Numbers are allocated counter-clockwise to the lead terminals 18 when the optical coupling apparatus is viewed from the upper surface as shown in FIG. 2. In this optical coupling apparatus, the terminals serially have the number 1 to the number 7 from the left side of the optical fiber 15 (upper right of the sheet of drawing in FIG. 2) and the number 8 to the number 14 on the opposite side (lower left of the sheet of drawing). The #1 and #2 lead terminals 18 are electrically connected to the thermistor 13. The #3 and #11 to #13 lead terminals 18 are electrically connected to the laser diode 1. The #4 and #5 lead terminals 18 are electrically connected to the photodiode 2. The #6 and #7 lead terminals 18 are electrically connected to the Peltier device. The terminal substrate 19 is a laminate sheet of a ceramic material and is bonded by brazing to the package 6 lest the lead terminals 18 electrically interfere with one another. An outer shape portion of the housing of the package 6 has a length (in the transverse direction of the sheet of drawing in FIG. 2) of 20.8 mm, a transverse width (in the vertical direction of the sheet of drawing in FIG. 2) of 12.7 mm and a height (in the vertical direction of the sheet of drawing in FIG. 1) of 6.5 mm, for example. The inside of the package 6 in which the laser diode 1 and the Peltier device 5 are installed has a length (in the transverse direction of the sheet of drawing in FIG. 2) of 18.8 mm, a transverse width (in the vertical direction of the sheet of drawing in FIG. 2) of 10.7 mm and a height (in the vertical direction of the sheet of drawing in FIG. 1) from the bottom surface of the base 7 to the optical fiber 15 of 3.5 mm. The material of the package 6 is an Fe—Ni—Co type alloy.

A pipe 8 is arranged on the side surface of the package 6 on the fitting side of the optical fiber 15 in such a fashion as to insert optical isolation 9 into the pipe 8. The pipe 8 is longer than the thickness of the sidewall of the package 6 and is so arranged as to protrude from the inside and outside of the package 6. A glass window 12 is formed on the end face of the inner side of the package 6 and is bonded by use of a low or high melting point solder (not shown) so as to allow the passage of the laser beam traveling from the aspherical lens 4 to the optical fiber 15 and to cut off the internal space of the package 6 from outside. In other words, a cap 26 fitted to the upper surface of the package 6 by seam welding and the glass window 12 hermetically seal the inside of the package 6.

The optical isolator 9 and the optical fiber holder 11 having therein the optical fiber 15 are mounted to the end face of the pipe 8 through the guide 10. The optical isolator 9 does not transfer the laser beam returning as the reflected beam from the side of the fiber 15 to the laser diode 1 and is necessary for keeping stability of the oscillation wavelength of the laser diode 1 and the outgoing beam. The optical fiber 15 is a single mode optical fiber having a core diameter of about 10 $\mu$m and is held and fixed inside the optical fiber holder 11 with an optical fiber cladding 16. Here, the distance from the laser diode 1 to the distal end of the optical fiber 15 is 6.0 mm, for example, and the distance from the outside surface of the package 6 to the distal end of the optical fiber 15 is 1.0 mm, for example. The optical fiber holder 11 has an outer diameter of $\phi$2.0 mm, for example, and is formed of a stainless type alloy material. The optical isolator 9 is connected and fixed to the distal end of the optical fiber holder 11 into a unitary structure.

Optical coupling between the laser diode 1 and the optical fiber 15 is attained by adjusting the positions of the optical fiber holder 11 and the guide 10 so that the front outgoing laser beam from the laser diode 1 can be condensed by the aspherical lens and can be introduced into the optical fiber 15 through the optical isolator 9. The optical fiber holder 11 is bonded and fixed to the guide 10 by laser welding (not shown) at the position at which the output laser beam from the optical fiber 15 reaches maximum. The guide 10 is further bonded and fixed to the end face of the pipe 8 by laser welding (not shown). In consequence, optical coupling is achieved between the laser diode 1 and the optical fiber 15.

Evaluation contents for examining stability of optical coupling between the laser diode 1 and the optical fiber 15 include optical coupling temperature characteristics (tacking error). This evaluation item stipulates a specification requiring that fluctuation of optical coupling should fall within a predetermined temperature range from a low temperature to a high temperature. A required specification for an optical coupling apparatus for long distance transfer, for example, stipulates in many cases that the temperature range be from $-20°$ C. to $75°$ C. and optical coupling fluctuation be within $\pm 0.5$ dB. The tracking error mainly occurs because the operating temperature of the optical coupling apparatus changes to invite thermal deformation and the optical coupling state between the laser diode 1 and the optical fiber 15 thereby changes. In the case of long distance transfer, the loss during fiber transfer becomes greater. Therefore, optical coupling fluctuation in the optical coupling apparatus must be minimal in order to conduct stable information transfer.

The length of the substrate 3 mounted onto the base 7 through the Peltier device 5 is set to 0.16 within the range from 0.1 to 0.25 relative to the length of the base 7 inside the housing of the package. This arrangement can reduce deformation of the substrate 3 even when warp deformation of the base 7 occurs due to the change of the ambient temperature and due to the thermal load and can suppress fluctuation of the traveling direction of the outgoing laser beam from the aspherical lens 4 mounted to the substrate 3. When undergoing thermal deformation, the sidewall of the package 6 deforms in such a fashion as to fall down towards the inside of the package 6 with the connection position with the base 7 being the support point. Therefore, the positioning error of the distal end of the optical fiber can be minimized when the optical isolator 8 and the optical fiber 15 are arranged inside the pipe 8 and furthermore, when the distal end of the optical fiber 15 is arranged at the position spaced apart by 1.0 mm from the inner and outer surfaces of the side surface of the package 6. Thermal stress analysis reveals that the sidewall of the package 6 inclines by about 0.04 degrees, and the positioning error of the distal end of the optical fiber 15 relative to this inclination must be kept within an allowable range. To keep the change of optical coupling (tracking error) resulting from thermal deformation within 0.5 dB, the positioning error of the distal end of the optical fiber 15 must be kept at 2.0 $\mu$m or below. Therefore, it is found through simple calculation that the distal end of the optical fiber 15 be arranged within the range of 3.0 mm from the inner and outer surfaces of the side surface of the package 3. The through-hole portion formed in the wall portion may be about 1 mm, for example. In the embodiment described above, the positioning error can be limited to about 0.7 $\mu$m because the distal end of the optical fiber 15 is arranged at the position of 1.0 mm. The optical coupling change at this time is 0.15 dB and can satisfy the target value of 0.5 dB. Since the side surface of the package 6 so operates as to suppress thermal deformation, deformation of the substrate 3 on the Peltier device 5 can be reduced and fluctuation of the laser beam outgoing from the aspherical lens 4 can be suppressed when the Peltier device 5 is positioned within the range of 6.0 mm close to the inner side surface of the package 6. Alternatively, a distance within the length of the temperature controlling device (Peltier device) in the direction of the optical path may well be secured. The length of the Peltier device 5 is preferably 7.0 to 8.0 mm, for example.

The range of disposition of the distal end of the optical fiber 15 and the mounting range of the Peltier device 5 can be accomplished by selecting an optical system that can achieve a distance of 3.5 to 7.5 mm from the laser diode 1 to the distal end of the optical fiber 15. The Peltier device 5 can also be arranged within the range from 3.5 to 12.5 times the thickness (maximum width) of the lens in the direction of the optical axis.

Figure 5:
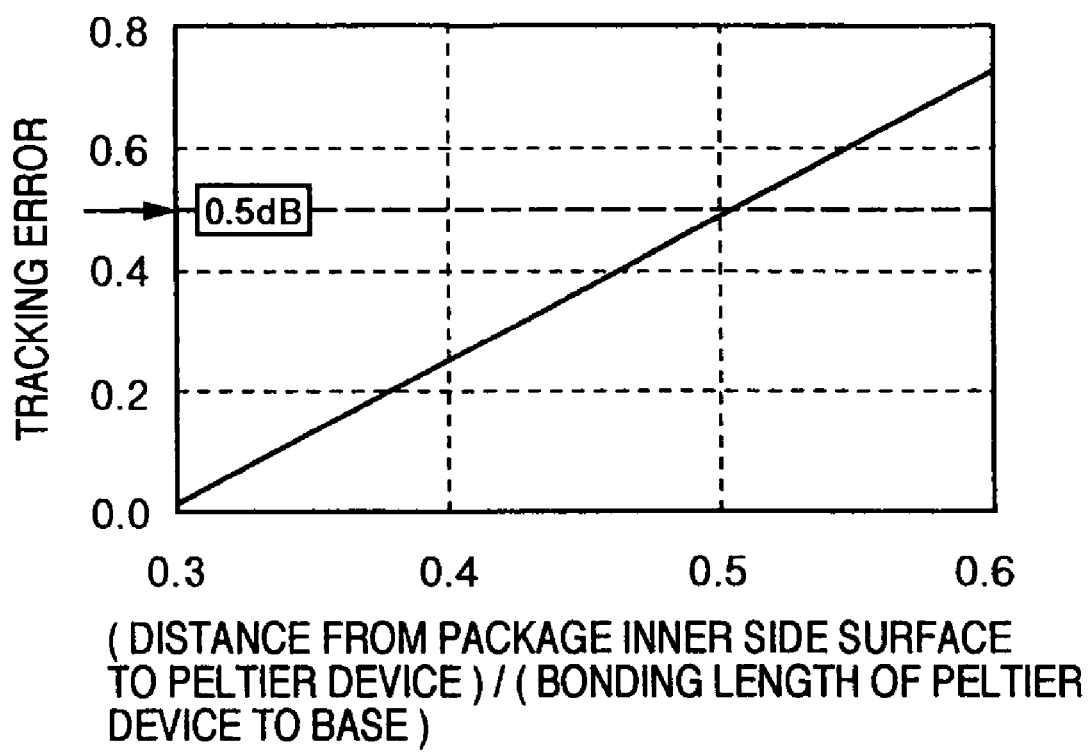
FIG. 5 is a diagram showing the relation between a mounting position of a Peltier device and a tracking error in the optical coupling apparatus according to the embodiments of the invention.

More specifically, the tracking error can be set to the target value of 0.5 dB or below when the distance from the inner side surface of the package 6 to the Peltier device 5 is so set as to attain a predetermined ratio with respect to the length of the lower surface ceramic sheet of the Peltier device 5 bonded onto the base 7 as shown in FIG. 5. Here, to attain the tracking error of 0.5 dB or below with the length of the lower surface ceramic sheet of the Peltier device 5 of 8.0 mm, for example, the distance from the inner side surface of the package 6 to the Peltier device 5 may well be set to 4.08 mm or below (0.51 or below in terms of the ratio). In the first embodiment, the distance from the inner side surface of the package 6 to the Peltier device 5 is 2.5 mm (0.3125 in terms of the ratio) and the tracking error in this case is 0.1 dB or below. The tracking error is greatly associated with the mounting position of the Peltier device 5, and it is effective to mount the Peltier device 5 close to the optical fiber as shown in FIG. 5. As described above, the change of optical coupling due to thermal deformation can be suppressed to a low level without employing a specific component construction by employing the construction for suppressing the positioning error of the distal end of the optical fiber 15 and the positioning error of the outgoing beam from the aspherical lens 4 and by employing the arrangement of the components for accomplishing such a construction. In other words, the optical coupling apparatus having only one lens optical system can satisfy the tracking error specification.

The metallize pattern film 30 of the terminal substrate 19 electrically connected to the Peltier device 5 is positioned closer to the optical fiber 15 than the lead terminals 18 corresponding to the Peltier device 5. According to this arrangement, the distance from the post 20 of the Peltier device 5 to the metallize pattern film 30 of the terminal substrate 19 can be shortened and wire bonding 24 can be formed with the smallest length. Consequently, calorific power due to the increase of the impressed current can be lowered and defect of the wire 24 due to the change of the ambient temperature, if any, can be prevented. An optical coupling apparatus having high reliability can be thus accomplished by stably driving the Peltier device 5. Furthermore, a wide space can be secured on the side opposite to the installation side of the optical fiber 15 while interposing the Peltier device 5 between them, and the semiconductor device 23 of this embodiment can be easily mounted. An optical coupling apparatus having versatility can be accomplished because an expansion unit for improving the functions can be installed without a drastic change of the construction. Because the optical isolator 9 and the optical fiber holder 11 are assembled into the pipe 8, the protruding distance of the optical fiber holder 11 protruding outside from the package 6 can be reduced. Consequently, the overall size of the optical coupling apparatus can be reduced and high-density mounting can be made to the mounting substrate. Further, because optical coupling between the laser diode 1 and the optical fiber 15 is achieved by only one lens 4, the number of components can be reduced and assembly can be conducted easily.

Figure 3:
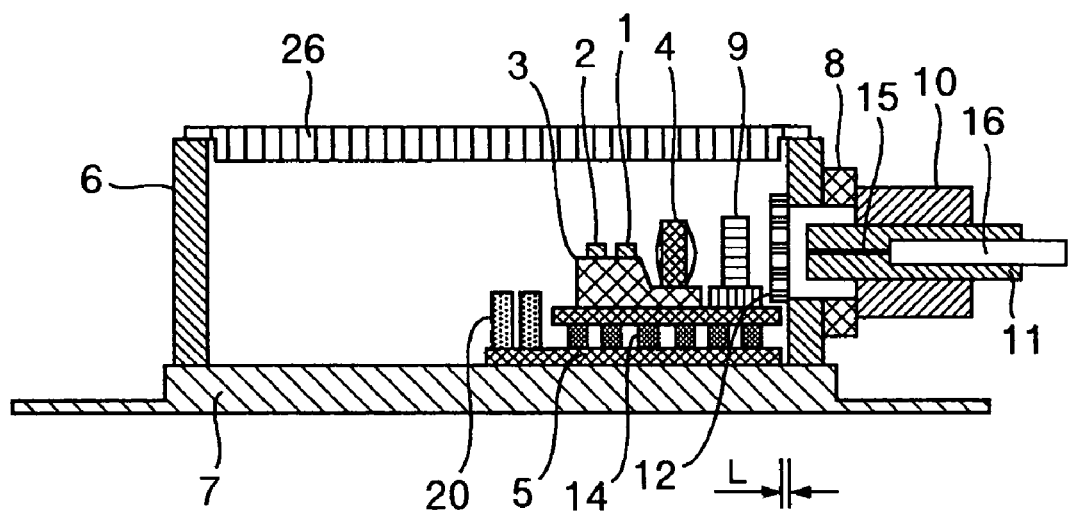
FIG. 3 is a longitudinal sectional view showing an overall construction of an optical coupling apparatus according to a second embodiment of the invention.

Next, FIG. 3 is a longitudinal sectional view showing a construction of an optical coupling apparatus according to a second embodiment of the invention.

The embodiment shown in FIG. 3 fundamentally has the same construction as that of the embodiment shown in FIG. 1 with the exception of the following points. In other words, the optical isolator 9 is mounted onto the Peltier device 5 inside the package 6 and the glass window 12 is directly bonded to the package 6.

The substrate 3 on the Peltier device 5 is arranged at a position away from the optical fiber 15 whereas the optical isolator 9 is mounted at a position close to the optical fiber 15. The optical isolator 9 is of a surface package type such that its lower surface is bonded to the Peltier device 5. The optical isolator 9 is mounted after its position is so adjusted as to introduce the laser beam from the aspherical lens 4. The laser beam is being condensed immediately before and behind the aspherical lens 4 and therefore has a large radius. For this reason, an optical isolator 9 is selected that has a greater effective diameter for introducing the laser beam than that of the optical isolator 9 fitted to the distal end of the optical fiber 15. The pipe 8 of the side surface of the package 6 is fitted so that it protrudes out from only the package 6. The glass window 12 is directly bonded to the inner side surface of the package 6. Here, the distance from the Peltier device 5 to the side surface of the package 6 is 0.5 mm, for example, the distance from the laser diode 1 to the distal end of the optical fiber 15 is 6.5 mm, for example, and the distance from the inner surface of the side surface of the package 3 to the distal end of the optical fiber 15 is 0.5 mm, for example.

As described above, the Peltier device 5 and the distal end of the optical fiber 15 can be arranged closer to the side surface of the package 6 than in the construction of the first embodiment and the change of optical coupling resulting from thermal deformation can be further reduced. Even when the optical coupling apparatus is of the type that uses the one-lens optical system in the same way as the first embodiment, the optical coupling apparatus can satisfy the tracking error specification. Further, temperature control becomes possible because the optical isolator 9 is mounted onto the Peltier device 5. Consequently, performance stability of the reflection characteristics of the optical isolator 9 can be improved, and an optical coupling apparatus having higher reliability can be acquired.

Figure 4:
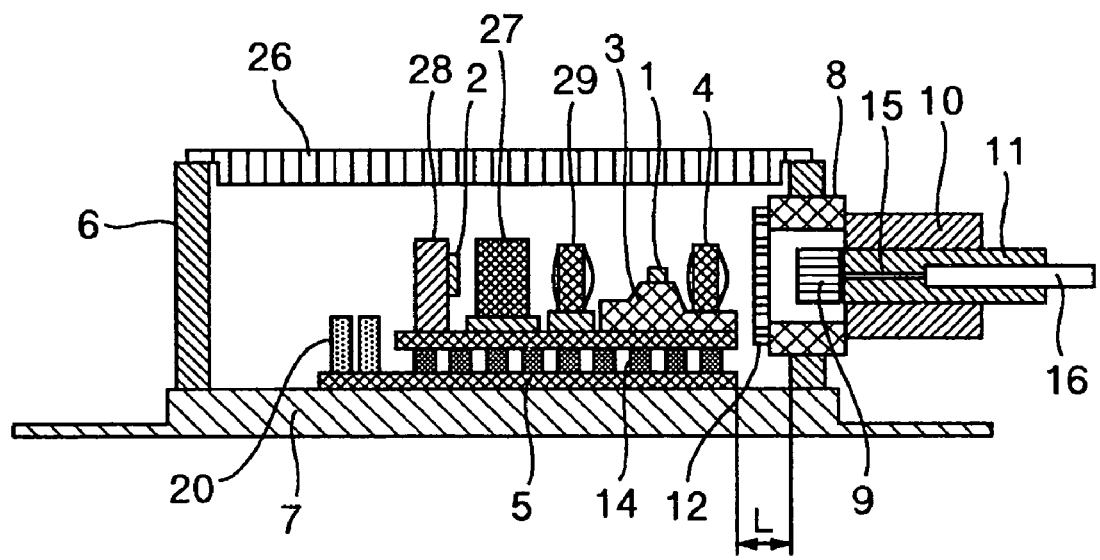
FIG. 4 is a longitudinal sectional view showing an overall construction of an optical coupling apparatus according to a third embodiment of the invention.

Next, FIG. 4 is a longitudinal sectional view showing a construction of an optical coupling apparatus according to a third embodiment of the invention.

The embodiment shown in FIG. 4 fundamentally has the same construction as that of the embodiment shown in FIG. 1 with the exception that a mechanism for monitoring the wavelength of the laser diode 1 is added to the Peltier device 5. A coupling lens 29 for condensing the rear outgoing laser beam of the laser diode 1 is arranged at the back of the laser diode 1 (on the left side of the sheet of drawing in FIG. 4), and the photo-diode 2 receives the laser beam through an optical filter 27. Two photo-diodes 2 are fitted to a carrier 28. One of them receives the laser beam through the optical filter 27 and the other directly receives the condensed beam from the coupling lens 29 without passing through the optical filter 27. The optical filter 27 transmits only the laser beam having a specific wavelength, and the beam reception amount of the photo-diode 2 changes depending on fluctuation of the transmitted beam. The monitor mechanism observes the change of this beam reception amount and monitors the wavelength oscillated from the photo-diode 2.

The photo-diode 2 for receiving the laser beam without passing through the optical filter 27 is for monitoring in the same way as in the first embodiment. These coupling lens 29, optical filter 27 and carrier 28 are mounted on the Peltier device 5 common to the laser diode 1 and make it possible to control the temperature. It is thus possible to stably monitor the wavelength without changing transmission performance of the optical filter 27. Here, the distance from the Peltier device 5 to the side surface of the package 6 (L in the drawing) is 2.5 mm, for example, and the distance from the laser diode 1 to the distal end of the optical fiber 15 is 6.0 mm, for example. Consequently, the Peltier device 5 and the distal end of the optical fiber 15 can be arranged at positions close to the side surface of the package 6 in the same way as in the construction of the first embodiment and the change of optical coupling resulting from thermal deformation can be limited to a small level. Therefore, even though the optical coupling apparatus uses the one-lens optical system, it can satisfy the tracking error specification.

The third embodiment selects the Peltier device 5 having a greater size than the Peltier devices 5 having the constructions of the first and second embodiments to mount various components. However, the Peltier device 5 having the same shape and size as shown in FIGS. 1 and 3 may be used, too. In this case, a sheet member is additionally provided to the upper surface of the Peltier device 5, and the substrate 3, the coupling lens 29, the optical filter 27 and the carrier 28 are mounted on this sheet member. The sheet member protrudes from the Peltier device 5. However, since the temperature distribution of the sheet member inclusive of the protruding portion is not greater than 1 when temperature control is made for the Peltier device 5, the portion protruding from the Peltier device 5 may well be formed.

The foregoing embodiments have been explained about the aspherical lens 4 by way of example, but a globular lens or a rod lens may be used, too.

The foregoing embodiments have been explained about the DFB laser diode 1 of the distribution feedback type by way of example, but other laser diodes 1 may be used, too.

The foregoing embodiments have been explained about the light emitting apparatus as the optical coupling apparatus by way of example, but a light receiving apparatus or a light receiving/emitting apparatus may be constituted, too.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical coupling apparatus comprising:
    a temperature control element on which a semiconductor light emitting element, a substrate and a lens are mounted, the semiconductor light emitting element being mounted on the substrate, and rays of light from the semiconductor light emitting element being introduced into the lens;
    a base on which the temperature control element is disposed;
    a through-hole portion formed in a housing wall portion installed on the base, penetrating through the housing wall portion and having a wall surface portion longer than a thickness of the housing wall portion; and
    an optical fiber communicated with the through-hole portion and receiving converted light from the lens introduced thereto;
    wherein a length of the substrate in a direction connecting the light emitting element to the optical fiber is within a range from 0.1 to 0.25 with respect to a length of the base sandwiched by the housing walls of the substrate.

2. The optical coupling apparatus according to claim 1, further comprising an optical isolator which communicates with the through-hole portion and into which the converged light is introduced on a side of the lens from an end portion of the optical fiber;
    wherein the optical isolator and at least a part of the optical fiber are arranged inside a region of the through-hole portion encompassed by the housing walls; and
    wherein the end portion of the optical fiber is arranged at a position within three times the thickness of the housing wall from an outer or inner side surface of the housing wall in a direction connecting the light emitting element and the optical fiber.

3. The optical coupling apparatus according to claim 1, wherein the end portion of the optical fiber is formed at a position within a range from 3.5 to 12.5 times a thickness of the lens from the light emitting element.

4. The optical coupling apparatus according to claim 1, wherein a distance from an inner side wall of the housing wall to the temperature control element in a direction connecting the light emitting element and the optical fiber is arranged within a range of 0.51 with respect to a length of a side surface of the base of the temperature control element.

5. The optical coupling apparatus according to claim 4, wherein the temperature control element is arranged within a range of 6.0 mm from the inner side wall of the housing wall in the direction of the temperature control element connecting the light emitting element to the optical fiber.

6. The optical coupling apparatus according to claim 1, wherein seven lead terminals for electrically connecting an inside and an outside of a housing are provided with a gap of 2.54 mm on each of housing side wall portions installed on the base, and a length of the base sandwiched by housing end wall portions installed on the base is 18.8 mm as an inner distance between the housing end wall portions in a direction of optically connecting the light emitting diode and the optical fiber.

7. The optical coupling apparatus according to claim 2, wherein seven lead terminals for electrically connecting an inside and an outside of a housing are provided with a gap of 2.54 mm on each of housing side wall portions installed on the base, and a length of the base sandwiched by housing end wall portions installed on the base is of 1.8. mm as an inner distance between the housing end wall portions in a direction of optically connecting the light emitting diode and the optical fiber.

8. The optical coupling apparatus according to claim 3, wherein seven lead terminals for electrically connecting an inside of an outside of a housing are provided with a gap of 2.54 mm on each of housing side wall portions installed on the base, and a length of the base sandwiched by housing end wall portions installed on the base is 18.8 mm as an inner distance between the housing end wall portions in a direction of optically connecting the light emitting diode and the optical fiber.

9. The optical coupling apparatus according to claim 4, wherein seven lead terminals for electrically connecting an inside and an outside of a housing are provided with a gap of 2.54 mm on each of housing side wall portions installed on the base, and a length of the base sandwiched by housing end wall portions installed on the base is 18.8 mm as an inner distance between the housing end wall portions in a direction of optically connecting the light emitting diode and the optical fiber.

10. The optical coupling apparatus according to claim 5, wherein seven lead terminals for electrically connecting an inside and an outside of a housing are provided with a gap of 2.54 mm on each of housing side wall portions installed on the base, and a length of the base sandwiched by housing end wall portions installed on the base is 18.8 mm as an inner distance between the housing end wall portions in a direction of optically connecting the light emitting diode and the optical fiber.

11. The optical coupling apparatus according to claim 1, wherein a housing installed on the base has an outer length of 20.8 mm, an outer width of 12.7 mm, an inner length of 18.8 mm and an inner width of 10.7 mm.

12. The optical coupling apparatus according to claim 2, wherein a housing installed on the base has an outer length of 20.8 mm, an outer width of 12.7 mm, an inner length of 18.8 mm and an inner width of 10.7 mm.

13. The optical coupling apparatus according to claim 3, wherein a housing installed on the base has an outer length of 20.8 mm, an outer width of 12.7 mm, an inner length of 18.8 mm and an inner width of 10.7 mm.

14. The optical coupling apparatus according to claim 4, wherein a housing installed on the base has an outer length of 20.8 mm, an outer width of 12.7 mm, an inner length of 18.8 mm and an inner width of 10.7 mm.

15. The optical coupling apparatus according to claim 5, wherein a housing installed on the base has an outer length of 20.8 mm, an outer width of 12.7 mm, an inner length of 18.8 mm and an inner width of 10.7 mm.

* * * * *